May 9, 1933.  W. A. BLUME  1,907,484
FRICTION BRAKE
Filed June 6, 1931
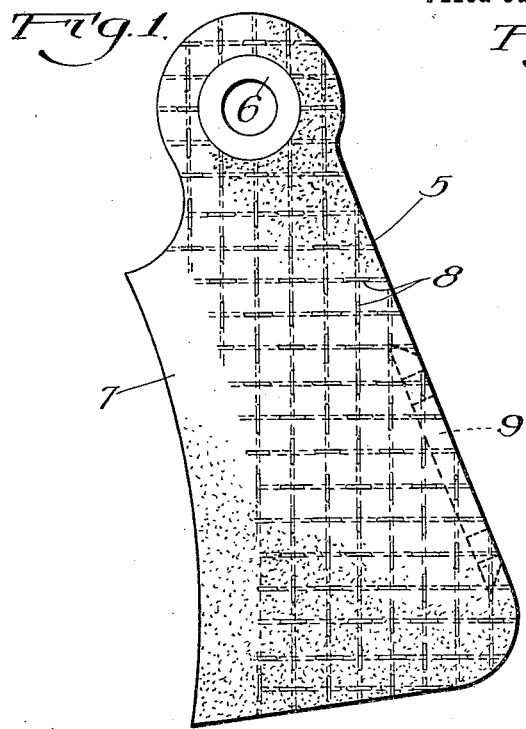
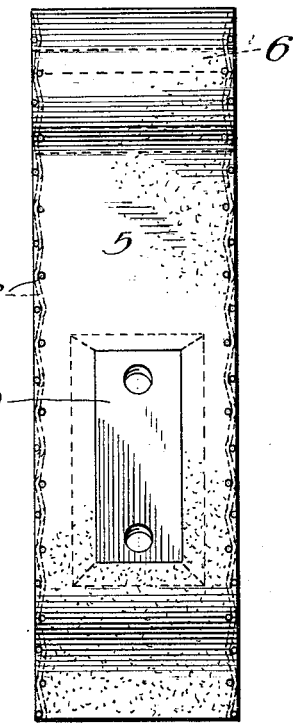
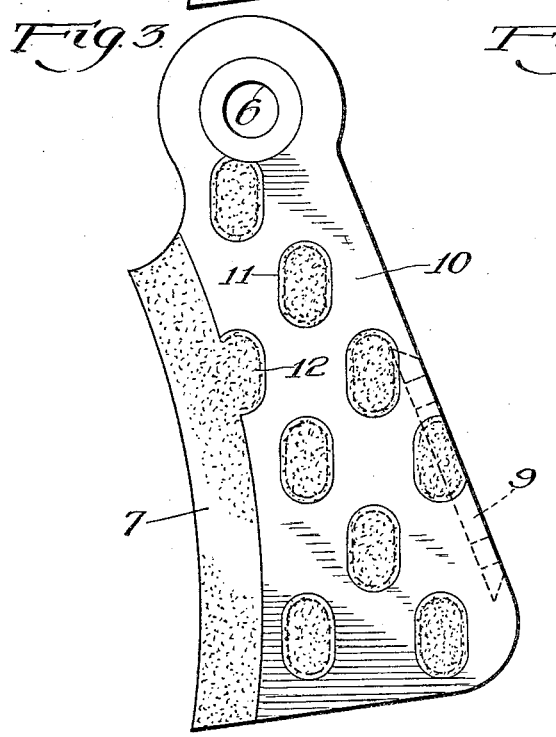
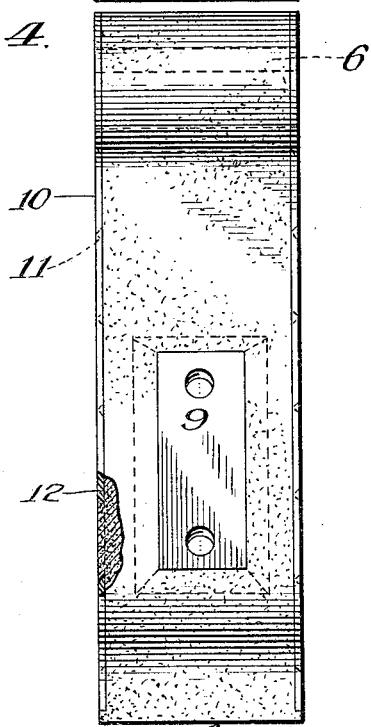

Patented May 9, 1933

1,907,484

UNITED STATES PATENT OFFICE

WILLIAM A. BLUME, OF DETROIT, MICHIGAN, ASSIGNOR TO AMERICAN BRAKEBLOK CORPORATION, OF NEW YORK, N. Y., A CORPORATION OF NEW YORK

FRICTION BRAKE

Application filed June 6, 1931. Serial No. 542,495.

This invention relates to friction brakes generally and it has for its object to provide a novel brake assembly of block and support especially adapted for rail cars as used by section and other employees of railroads and for other and similar purposes.

The object of the invention is to provide a solid composition brake block especially adapted for rail cars and to reenforce and protect the block against damage in handling and in use and so that it may be continued in efficient service until worn to the limit of wear.

In the accompanying drawing illustrating selected embodiments of the invention

Fig. 1 is a side elevation of a brake block having mesh reenforces embedded in its sides.

Fig. 2 is a rear elevation of the brake block shown in Fig. 1.

Fig. 3 is a side view showing a brake block with perforated side plate reenforces.

Fig. 4 is a rear elevation of the brake block shown in Fig. 3 and partly broken away.

Referring to Figs. 1 and 2 of the drawing, the block 5 comprises a composition body provided at its upper end with a bushing 6 by which it is pivotally mounted on the frame of the car to hang downwardly adjacent the wheel tread. The front of the body comprises a wear portion 7 which is shaped to conform as may be desired with the tread of the wheel. Each side of the body, except at the wear portion 7, has a reenforce 8 embedded therein. The reenforce may be made of wire mesh or expanded metal and it preferably covers the entire area of the side of the body except at the wear portion. The reenforces are embedded in the body in the manufacture of the block and serve to protect the body against damage in handling and in use and to strengthen the body and hold it together until the wear portion has worn away. The limit of wear is preferably indicated by the edges of the reenforces adjacent to the wear portion since it is not desirable that the reenforces should contact with the tread of the wheel because of the liability of scoring the tread. A plate 9 is embedded in the back of the block to which the brake operating mechanism is connected.

In Figs. 3 and 4 the reenforces are plates 10 and these plates are provided with openings 11 of any size and arranged in any desired manner to receive the body material. The edges 12 about the openings are preferably beveled so that the body material in the openings will make anchoring engagement therewith. I may use any suitable friction composition for the block, such, for example, as described in Letters Patent 1,761,057 and 1,761,318, patented June 3, 1930.

I have shown the invention in sample forms adapted for one type of rail car blocks but I reserve the right to make all such changes in the shape, construction and arrangement of parts as may be necessary or desirable to adapt the invention for other types of blocks and for other purposes within the scope of the following claims.

I claim:

1. A rail car brake block comprising a solid composition body having a bushing embedded therein at its upper end, a wear portion at the front of the body, and reenforces having openings therein and embedded in the sides of the body except at said wear portion.

2. A rail car brake block comprising a solid composition body having a wear portion at the front of the body, a plate embedded in the back of the body to which the brake operating mechanism is connected, reenforces having openings therein and embedded in the sides of the body, and a bushing embedded transversely in the body at the upper end thereof, the ends of said bushing extending through said reenforces and lying flush with the side surfaces of the body.

WILLIAM A. BLUME.